United States Patent [19]

Anaya

[11] Patent Number: 4,519,414
[45] Date of Patent: May 28, 1985

[54] MECHANICALLY BALANCED TAPERED PLUG VALVE

[75] Inventor: Jose R. Anaya, Coacalco, Mexico

[73] Assignee: Industrial de Valvulas, S.A. de C.V., Tepotzotlan, Mexico

[21] Appl. No.: 458,983

[22] Filed: Jan. 18, 1983

[51] Int. Cl.³ .............................. F16K 5/16; F16K 5/22
[52] U.S. Cl. ............................... 137/246.22; 251/283; 251/309
[58] Field of Search .............. 137/246, 246.11, 246.13, 137/246.15, 246.21, 246.22; 251/214, 283, 309, 310, 311, 312

[56] References Cited

U.S. PATENT DOCUMENTS

| Re. 19,068 | 1/1934 | Martin, Jr. | 137/246.22 |
| 1,624,512 | 4/1927 | Shipley | 251/283 |
| 3,101,191 | 8/1963 | Wolfensperger | 251/309 |
| 3,450,384 | 6/1969 | Watts | 251/312 |
| 3,458,172 | 7/1969 | Burrows | 251/214 |
| 4,034,776 | 7/1977 | Eshghy | 137/246.22 |
| 4,135,544 | 1/1979 | Macleod | 137/246.22 |
| 4,174,092 | 11/1979 | Macleod | 137/246.22 |

Primary Examiner—George L. Walton
Attorney, Agent, or Firm—Ladas & Parry

[57] ABSTRACT

The invention is a novel hermetic tapered plug valve having a spring-like resilient mechanism for providing axial balance to the plug and thereby prevent valve lock up.

3 Claims, 4 Drawing Figures

MECHANICALLY BALANCED TAPERED PLUG VALVE

BACKGROUND OF THE INVENTION

These valves usually comprise a tapered plug located within a similarly tapered housing or valve seat; said plug has a passageway for allowing fluid flow when in an open position.

These valves work in two positions: "closed" when the walls of the tapered plug shut-off the flow of the fluid through the valve and "open" when rotating the plug 90° (one quarter of a turn), to provide for the passageway to become aligned with the coaxial passageway of the pipeline, thus allowing the continued flow of the fluid.

The space between the tapered plug and its tapered seat is minimum to provide for hermetism and high pressure lubrication. The thickness of the lubricant film between the plug and seat is of thousands of an inch. Therefore, a failure in lubraication will produce contact between both parts. When the failure in lubrication exceeds certain limits, the plug gets tightened with its seat. To prevent this, the development of this kind of valve has aimed toward the following objectives:

(1) To provide a pressurized lubrication; (2) to obtain precise control of plug axial movements to prevent contact between the plug and its seat by unbalancing; (3) to provide an identical pressure in upper and lower ends of the plug by means of a system that compensates the excess pressure at one end with the lack of pressure at the other end; (4) do not reduce the life nor the quality of the valve when solving the above mentioned problems. It is also desirable to provide a valve which is long-lasting and efficient as well as easy to manufacture at the lowest possible cost.

The development of related valves is specified as follows:

U.S. Pat. No. 1,584,699—Mar. 5, 1925 Non-lubricanted valve (present concept). It discloses a bronze bushing which serves as a jacket for the plug to rotate, keeping the plug in place by means of an helicoidal spring, it is a bottom entry plug valve. It has grooves for lubrication in the walls. It has a check valve that allows the pressure to flow to the bottom (larger diameter tapered side) in openning position and pushing the plug to its seat, the same than the spring, both providing tightening.

U.S. Pat. No. 1,680,812—Aug. 14, 1928 Non-lubricated valve, directional at 90°. It refers to a dynamic balance mechanism similar to the idea of the present dynamic balance (see U.S. Pat. No. 4,174,092) by means of two holes which connect the port with upper and lower chambers of the plug, it has an helicoidal spring to keep the plug positioned with respect to the body, causing tightening and a excentric cam type system for closing the valve.

U.S. Pat. No. 1,671,603—May 29, 1928 Lubricated valve. Dynamic balace patent, obtained when the pressure of the plug's upper and lower chambers is made even. The communication of the upper chamber is obtained through a hole in the body, preventing sealant leakage by means of a check valve. This, in part, is similar to the new dynamic balance design. (see U.S. Pat. No. 4,174,092).

U.S. Pat. No. 2,079,774—May 11, 1937 Lubricated valve. It discloses plug balance through the action of 2 pistons connected to the plug mechanism (equalizer type), the reciprocating action of the pistons is obtained by the fluid pressure which helps separation and minimizes the tightening rotating force.

U.S. Pat. No. 2,286,689—June 16, 1942 Lubricated valve. It discloses the plug balance by balancing the pressure in both ends of the plug which is obtained by the flow of fluid pressure, first to the lower chamber (larger side) and then through a lateral hole in the plug which carries the pressure to the sealant chamber, and to prevent the sealant from leaking there is a check valve.

U.S. Pat. No. 2,945,668—July 19, 1960 Lubraicated valve. Bottom entry plug valve which has a sealant chamber similar to the present one. It discloses a dynamic balance produced by pressure difference between fluid and atmospheric pressures. Both plug ends are exposed to atmospheric pressure. It has no adjustable screw, instead it has a spring which positions the plug and allows its movement.

U.S. Pat. No. 3,115,151—December 24, 1963 Lubricated valve. It discloses a pressure balance between the fluid side valve, the plug passageway in closed position and the plug chamber at the larger diameter side, it uses a sling valve placed in the plug, thus making pressures even, and the plug balance is complemented with the sealant at the chamber.

U.S. Pat. No. 4,135,544—June 23, 1979 Lubricated valve. (Dynamic balance 1st option). The balance is provided by an helicoidal spring in the sealing chamber, and the larger diameter of the tapered plug is exposed to the atmospheric pressure, obtaining the balance by pressure difference.

U.S. Pat. No. 4,174,092 discloses an hydraulic balance valve which compensates the variations in the line pressure. When the pressure in the upper chamber diminishes to a pressure below to that of the line pressure, a check valve opens and thereby allows passage of the line pressure to said upper chamber, thus conpensating both pressures and thereby preventing valve lock up.

SUMMARY AND OBJECTS OF THE INVENTION

According to the above, it is clear that the object of this invention is to provide a lubricated and hermetic tapered plug valve with mechanical balance by means of a resilient mechanism.

This technical improvement is aimed to obtain a hermetic valve whose plug is in axial balance with a predetermined position, in order that, during the operation it never gets tightened to its tapered seat, thereby the plug always has an easy rotation.

In order to achieve this object of the invention, it is necessary that following conditions be met:

(a) That the valve have a mechanism that actuates as a resilient element concentric to the longitudinal axis of the plug.

(b) That there always be a predetermined plug position in respect to the body such that a small separation between the tapered walls of the body and the plug is guaranteed.

(c) That the mechanism which actuates as the resilient element be of the spring type, in which the deflecting piece is a plane washer which actuates between two parts having slopping walls in order to attain a spring effect.

(d) That the stem which drives the plug be always in contact with the valve's body, so that no displacement of the plug's axis is allowed.

(e) When assembling the plug, consideration is given to the fact that the plug is first driven to a first adjustment position with respect to the body by means of a screw located in the larger side of the plug, therefore, a deflection in the spring washer is produced; at this moment a maximum separation between the tapered walls of the body and the plug exists.

(f) When the line pressure actuates, a hydraulic force is produced on the larger side of the plug, whereby the plug will be driven to a second position with respect to the body and, consequently, the resilient mechanism keeps the balance and position of the plug, even though said mechanism would tend to solidify into forming one single piece, also, a minimum separation between the tapered walls of the body and the plug will prevail.

In order to balance the hydraulic force described above, there is an axial force in the longitudinal axis of the plug, which is generated by the pressure of the sealant at the lower side chamber of the plug. Would the force caused by the sealing pressure be reduced to a level lower than the line's pressure, it will fill the sealant chamber, whereby the plug will continue to be in a static balance.

The resilient mechanism will also prevent the tightening caused by the effect of the plug's weight when changing the valve's position, or, by changes in volume caused by temperature variations of the fluid controlled by the valve.

In order to better illustrate the invention a set of drawings is enclosed, in which.

DETAILED DESCRIPTION OF THE INVENTION

Figure 1:
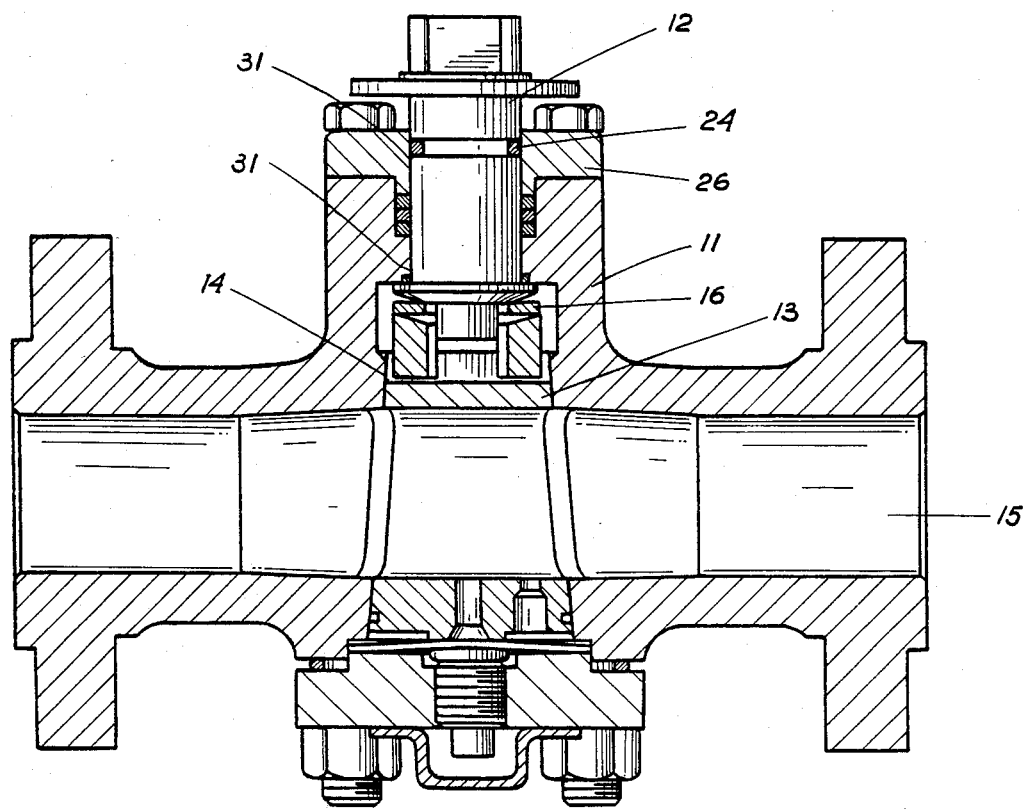
FIG. 1, is a longitudinal sectional view of the valve's body.
Figure 2:
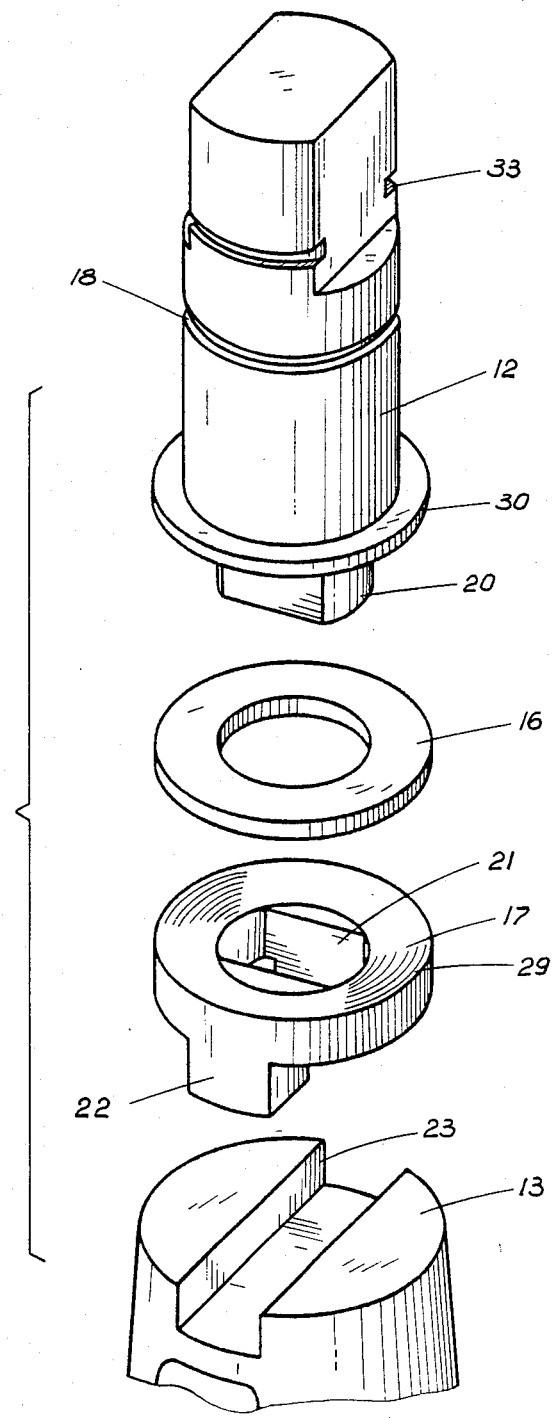
FIG. 2, is a perspective view of the spring mechanism and its components.
Figure 3:
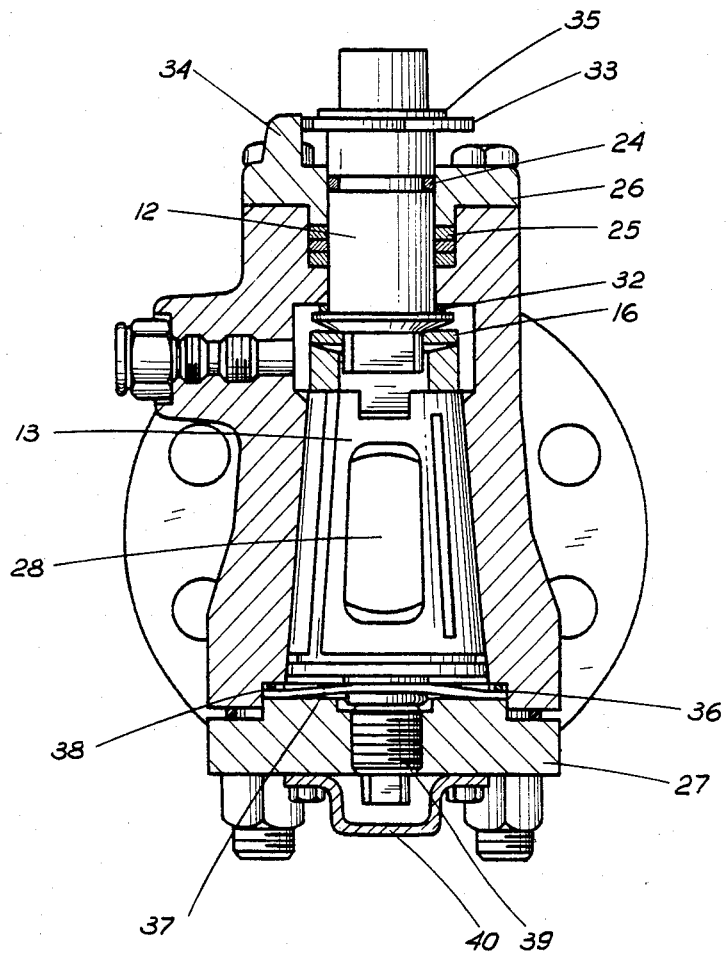
FIG. 3, is a cross sectional view of the valve's body.
Figure 4:
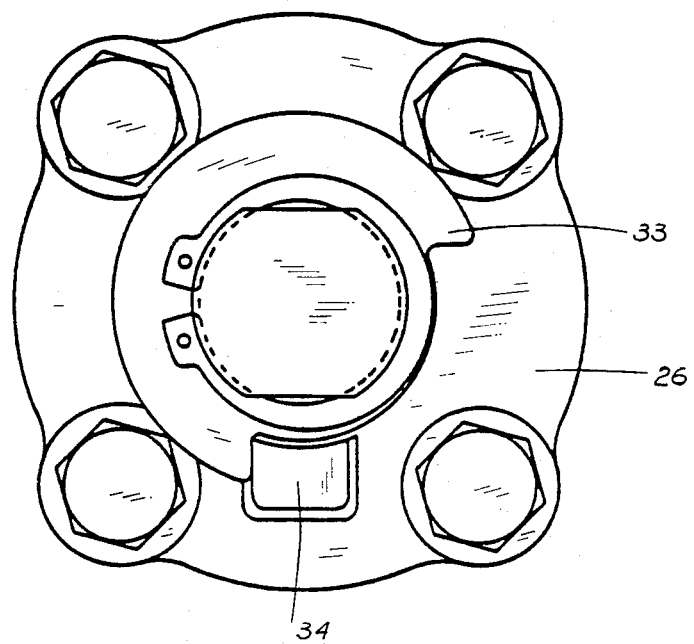
FIG. 4, is an upper view of the valve.

The valve consists of a body 11, a fluid passageway 15 which passes through tapered seat 14 on which plug 13 is seated.

Such plug 13 has generally a truncated cone form and a hole 28 for fluid flow. When plug 13 is rotated 90° the fluid flow is hermetically shut-off. Plug 13 has a groove or slit 23 in its upper side which receives the lower projections 22 of equalizer 17. Plane washer 16 fits on the upper perimeter 29 of tapered seat of the equilizer 17. Lower projection 20 of the stem 12 enters the orifice of washer 16 and is placed on seat 21. This allows conical plate 30 of stem 12 to fit in the bored washer 16.

Therefore, washer 16 has a deflecting movement and provides a spring mechanical balance to plug 13.

90° rotating movement of plug 13 is produced by rotating movement of stem 12.

Equalizer 17 has an upper perimeter 29 which is the seat of deflecting washer 16, said equalizer 17 has a seat 21 for projection 20 of stem 12. The wall between seat 21 and upper perimeter 29 is conical or tapered to allow deflection or spring movement of washer 16.

Coupling between projection 20 and seat 21 is a free vertical movement. Movement between projection 22 and and groove 23 is vertically free. However, in both cases, there is a positive mechanical contact for a rotating movement.

Stem 12 is firmly placed in hole 31 defined by upper cover 26, high pressure seal 25, valve body 11 and packing 32.

Axial rotating movement of stem 12 and plug 13 and intermediate parts between them is limited to 90° by flange 33 and stop 34. The safety device (pin) 35 or flange 33 fixes it in position.

Lower cover 27, valve body 11 and plug 13 define a lower chamber 36 where plate 37 is located, which is positioned peripherically under pressure of gasket 38. Screw 39 is used to adjust plug's position. Cover 40 protects screw 39. Atmospheric seal 24 is paused in groove 18 to keep high pressure seal 25 from external damage. Although the above description sets forth one embodiment of same, it is understood that the scope of the protection applied for should be defined only by the following:

It is claimed:

1. A mechanically balanced tapered plug valve of a type used for fluid flow control, comprising a body with an interior chamber serving as a seat for a rotating tapered plug, which has a rotating fixed support at its lower end and a groove at an upper end for coupling with resilient elements for providing axial balance to the rotating plug and thereby preventing valve lockup produced by pressure and temperature variations of the fluid flowing through the plug valve, said resilient elements transmit axial rotating movement produced by an external driving of a valve stem, said resilient rotatihng movement transmission elements having a seat element having an upper circular face tapered toward the center of the seat element adapted to be received in said groove, a flexible plane washer that fits on the external and upper edge of the seat element receiving a circular flange of the valve stem, said circular flange having an inverted conical plate with a lower circular surface contacting the flexible plane washer, and wherein the tapering of the plate provides a spring movement space at the immediate upper area of the flexible washer and wherein the sloping of the tapered seat provides a spring movement area immediately below said flexible washer to prevent the tightening caused by the effect of the rotating plug's weight when changing the position of the rotating plug, or by changes in volume caused by temperature variations of the fluid controlled by the balanced plug valve.

2. A valve according to claim 1, wherein the plug is rotated only by the stem and wherein the mechanical balance movement of said plug is determined by the resilient elements to provide a space between the outside wall of the plug and inside tapered chamber where said plug fits.

3. A valve according to claim 1 includes elements for injecting lubricant under pressure to the chamber formed by the space between the plug and the inside tapered wall of the valve.

* * * * *